JOE T. PIERCE
INVENTOR

Aug. 4, 1970 J. T. PIERCE 3,522,492

SUPERCONDUCTIVE BARRIER DEVICES

Filed Oct. 23, 1967 8 Sheets-Sheet 2

Aug. 4, 1970 J. T. PIERCE 3,522,492

SUPERCONDUCTIVE BARRIER DEVICES

Filed Oct. 23, 1967 8 Sheets-Sheet 6

United States Patent Office 3,522,492

Patented Aug. 4, 1970

3,522,492

SUPERCONDUCTIVE BARRIER DEVICES

Joe T. Pierce, Richardson, Tex., assignor to Texas Instruments Incorporated, Dallas, Tex., a corporation of Delaware Filed Oct. 23, 1967, Ser. No. 677,327
Int. Cl. H01l 15/00
U.S. Cl. 317—235 4 Claims

ABSTRACT OF THE DISCLOSURE

Disclosed are superconductive barrier devices, comprising a gate region with a control line adjacent to the gate, which can perform cryogenic switching and logic functions. According to the various embodiments, the gate region may comprise a relatively thin superconductive layer separated by a very thin insulative layer from a relatively thick superconductive layer, a discontinuous superconductive layer separated by a thin insulative layer from a thick superconductive layer, a pair of superconductors separated by an insulating barrier thin enough to permit electron pair tunneling therethrough, or a granular superconductor wherein the grains are separated by an insulating barrier thin enough to permit electron pair tunneling therethrough. Also disclosed are superconductive barrier devices comprising granular superconductors which may be employed as millimeter or submillimeter radiation generators or detectors.

This invention relates to superconductive barrier devices. More particularly, it relates to novel configurations for using the magnetic field sensitivity of superconductive barrier devices, including superconductive tunneling barriers, and to novel configurations for enhancing the radiation generation capabilities of superconductive tunneling barriers. Hence, in one aspect the invention relates to cryogenic switching and logic devices, and in another aspect it relates to generators of millimeter and submillimeter wavelength radiation.

In one particular aspect the invention relates to a superconductive barrier device which can serve as a cryotron or switching device comprising two superconductors separated by a very thin insulating barrier. More particularly, the device comprises a relatively thin superconductive film superposed over a relatively thick superconductive film but separated by a very thin insulative film. In the superconductive state, even though the gate lines are connected to the thin superconductive film the barrier device is able to carry a relatively large current, i.e., at least as great as the critical current of the thick film. However, when the gate is switched to the normal state by a control line positioned over it, the gate exhibits the normal characteristics of the thin film. Thus, the device provides increased gain due to its higher current carrying capability and increased speed due to the high resistance in the normal state.

While applicant does not wish to be bound by theory, it is believed that this effect may be due to electron coupling across the barrier due to the coherence length of the superelectrons. A theoretical explanation of superconductive pairing of two electrons separated by a barrier has recently been offered by Morrel H. Cohen and D. H. Douglas, Jr., "Superconductive Pairing Across Electron Barriers," Physical Review Letters, vol. 19, pp. 118–121 (July 17, 1967).

In another particular aspect, the invention relates to superconductive tunneling devices often referred to as Josephson junctions, after Brian D. Josephson, who in 1962 predicted that two different phenomena can occur between two superconductors which are separated by an extremely thin (10–15 A.) insulating barrier or layer.

The first is that a direct current can be observed to flow between the superconductors without a voltage drop even though the two are still physically separated. This phenomenon is called the DC Josephson effect. The second of the phenomena is that a direct current can flow between the superconductors with a voltage drop while simultaneously very high frequency electromagnetic radiation emanates from the barrier indicating the presence of a very high frequency alternating current. This phenomenon is called the AC Josephson effect. Both phenomena are a direct consequence of the unique nature of superconductivity. See B. D. Josephson, "Possible New Effects in Superconductive Tunneling," Physics Letters, vol. 1, pp. 251–253 (July 1, 1962).

The DC Josephson current is a supercurrent traveling by Cooper pair or electron pair conduction from one superconductor to the other through the insulating layer with no voltage drop and hence is frequently termed zero voltage current. The magnitude of this current is dependent in part upon the type of superconductors used, the dimensions of the insulating region, and the temperature. The magnitude of this current is also critically dependent upon the magnitude of the magnetic field in the barrier. The maximum net DC Josephson current that can be carried by the barrier decreases periodically (repetitively at regular intervals) as the magnetic field is increased. If an attempt is made to cause more current to flow across the barrier than this magnetic field will allow, the supercurrent switches off and there is a transition in the Josephson barrier from a Cooper pair tunneling state, in which current can flow through the barrier region without any voltage drop, to a single electron tunneling state in which the current flows with a voltage drop across the barrier. It should be noted that at no time do the superconductors change from the superconductive to the normal state. Because there is no such transition and because the active barrier region is small in surface area, the transition time to full voltage is very short.

In accordance with one aspect of applicant's invention, a control line or layer is positioned over but insulated from a superconductive tunneling device. An electrical pulse of appropriate magnitude through the control line generates a magnetic field which switches the Josephson barrier from one tunneling state to the other. In accordance with another aspect of the invention, superconductive tunneling devices are disclosed having granular superconductor members. These devices may be employed as switching or logic devices.

As Josephson predicted, an alternating current oscillates back and forth between the two superconductors of the barrier at a frequency proportional to the voltage across the junction. See "The Josephson Effects," D. M. Langenberg et al., Scientific American, vol. 214, pp. 30–39 (May 1966). Thus the Josephson barrier offers itself as an attractive source of coherent millimeter and submillimeter wave radiation (from 100 to 1000 gHz.). Although the power available from a single junction comprising two layers of superconductors separated by a thin insulating film appears to be very limited, applicant has perceived that greater power can be obtained by constructing an AC Josephson radiation generator from a kind of granular or particular superconductor wherein each grain or particle consists of a homogeneous superconductor, but at each grain boundary there is an insulating layer thin enough to be tunneled by the electron pairs of the superconductor, thus forming a Josephson barrier at each grain boundary.

Applicant has found that the granular superconductor of this invention can be fabricated in one of two basic forms. First, a multiplicity of small spheres, or other particles, of a superconductor can be packed tightly on a substrate or formed into a sponge-like construction. The superconductor particles can be oxidized to form an insulating barrier or they can be dispersed in a binder material which serves to separate the particles at the appropriate distance. Secondly, a layer of superconductor can be deposited and then anodized to form islands of homogeneous superconductor separated by oxide and spaced so that tunneling can occur between the islands. The power of such devices is proportional to the number of Josephson barriers contained in the radiating surface. Since relatively small particles can be used, thousands of radiators can be contained in a relatively small device, and hence an increase in the power radiated of many orders of magnitude can be obtained. It will be appreciated that the granular superconductor configuration described above for use as a radiation generator can also be used as a detector of millimeter and submillimeter radiation. Since, for efficient detection incident radiation should be perpendicular to the tunneling barrier and since the barriers in the granular superconductor are relatively exposed, i.e., not shielded by the superconductive layer as is the barrier of a Josephson device formed by a pair of overlapping superconductors, the granular superconductor, Josephson barrier radiation detector offers greater ease in coupling incident radiation into the device, and hence greater sensitivity.

The granular superconductor, electron pair tunneling device can also be employed as a gate region in a cryotron. Such a configuration offers substantial advantages with respect to static gain. Since such a gate is essentially many Josephson barriers connected in parallel, it can be easily switched by a small control current in a control line adjacent the gate. Accordingly, since a small current can be used to switch a comparatively large current, high gain can be achieved.

Accordingly, it is an object of the invention to provide a superconductive tunneling cryotron or a switching device. A further object of the invention is to provide a cryogenic flip-flop memory or logic element employing Josephson barriers. Another object of the invention is to provide a granular superconductive tunneling device. Yet another object of the invention is to provide a generator or detector of very high frequency radiation. Other objects, features and advantages of the invention will be better understood upon consideration of the following detailed description in connection with the appended claims and accompanying drawings in which:

Josephson barrier devices are operated at a temperature below the transition temperature of the superconductor used. By way of example, if lead which has a transition temperature of 7.3° K. is used the Josephson effect is readily observed at the temperature of liquid helium (4.2° K.). Accordingly, in order for the devices to operate they generally must be contained in a cryogenic refrigerator of some kind. However, since this type of apparatus is well known in the art, it has not been illustrated, and in the following detailed description of the operation of the invention, it is assumed that the device is in such a low temperature environment that superconductivity is possible.

Figure 1:
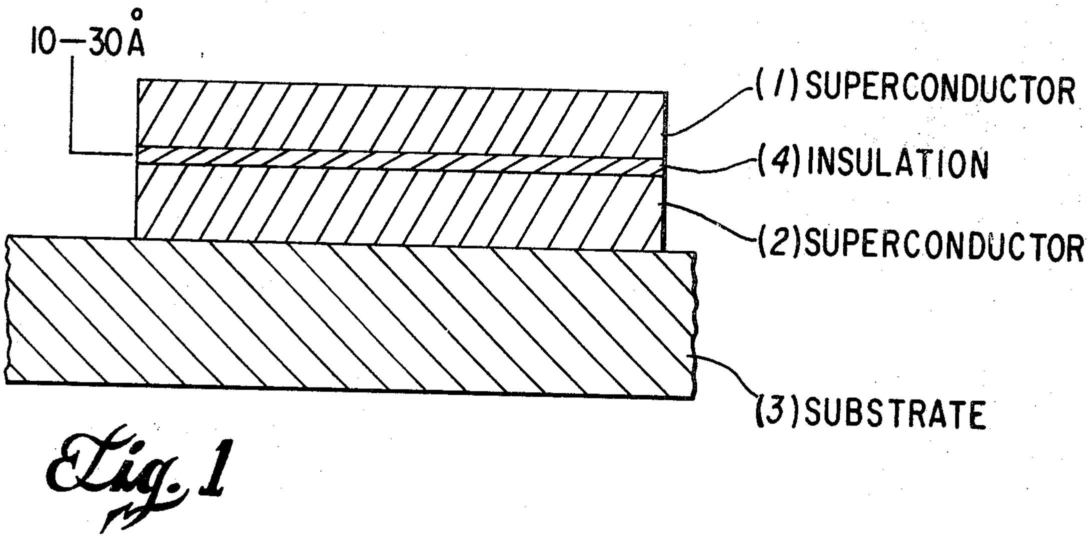
FIG. 1 is a partial cross-sectional view of a Josephson barrier.

Referring to the figures of the drawing, the superconductive barrier illustrated in FIG. 1 is typically fabricated by depositing strips of superconductors 1 and 2 in sequence upon a substrate 3 by techniques known in the art. The substrate 3 may itself be a dielectric or if not, it may be provided with an insulative surface. The insulation 4 layer between the strips in the region forming the junction is generally provided by oxidizing the surface of the first deposited strip 2 before depositing the second strip 1. This may be accomplished by a number of techniques including the glow discharge technique to be described hereinafter. The thickness of such an oxide layer is preferably 10–15 A. Typical materials for the superconductor sandwich are lead (Pb)—lead oxide-lead, and tin (Sn)—tin oxide-tin.

Figure 2:
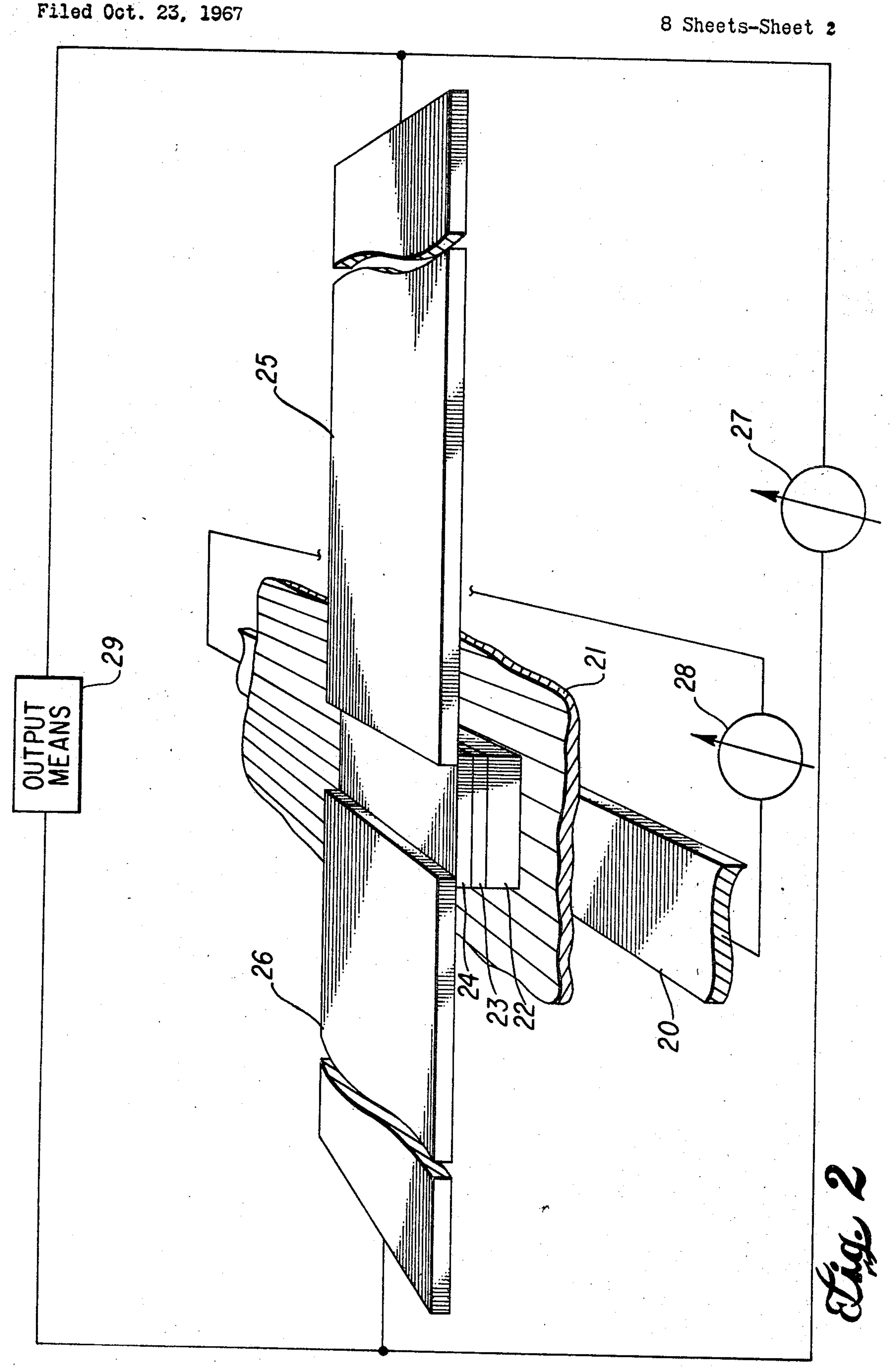
FIG. 2 depicts a device of the invention.

FIG. 2 illustrates one embodiment of the invention. For simplicity of illustration, the conventional ground plane has been omitted from the drawing. The device comprises a control line 20, insulating layer 21, a superconductive gate member consisting of a thick superconductive layer 22, a barrier region or layer 23, a superconductive gate member consisting of a thin superconductive layer 24, and lead (Pb) gate lines 25 and 26. The device can be made by vacuum evaporating the various layers of material through appropriate masks.

For purposes of illustrating the barrier region, the control line 20 is shown located beneath the gate. However, in actually fabricating the device, it is preferable to locate the control above the device, i.e. adjacent the thin superconductive gate layer so that the magnetic flux from the control more readily penetrates the thin superconductive gate member and drives the gate normal. Accordingly a suitable fabrication sequence includes the following. A ground plane (not shown) is vacuum evaporated onto a suitable substrate such as glass. Thereafter the substrate is removed from the vacuum system and coated with a layer of photoresist material such as AZ–340 made by the Azoplate Corporation which serves to insulate the ground plane from the remainder of the device structure. Next the thick tin gate member 22, having for example a thickness of about 6000 A. is put down by evaporation and masking. The barrier region 23 can be formed by breaking the vacuum and exposing the tin gate layer 22 to the atmosphere to allow the formation of an oxide layer which permits superconductive pairing of electrons separated by it, such as a layer about 10–30 A. thick, or appropriate means such as described in patent application Ser. No. 415,845, filed Nov. 16, 1964, now Patent No. 3,402,073, can be provided in the vacuum system to strike an oxygen glow discharge and thereby form the oxide layer. Next, the tin gate layer 24, having a thickness preferably less than 1000 A. is vacuum deposited through an appropriate mask. The lead gate lines 25 and 26 are vacuum deposited through an appropriate mask to contact the tin gate layer 24 as shown. Finally, the gate region is covered with suitable insulation of about 3000 A. in thickness to insulate it from the control line 20, which may be lead (Pb) about 5000 A. thick and 10 mils wide and deposited by vacuum evaporation and use of an appropriate mask.

Variable direct current source means 27 are provided to cause current to flow from gate line 26 through the superconductive gate members 22, 23 and 24, and into the gate line 25. Variable direct current control means 28 are also provided to cause current to flow in the control line 20.

When the device is operated in the superconductive mode, the current flows from the gate line 26 through the superconductive gate members 22, 23 and 24, and into the gate line 25. Due to its novel configuration, the gate region is able to carry a much larger supercurrent than the thin tin gate layer 24 alone could carry. It is believed that the superconductive properties of thin gate layer are enhanced by coupling of electrons in the thin tin gate layer to electrons in the thick tin gate layer due to a coherence length effect. If a current is passed through the control line 20 generating a magnetic field of sufficient magnitude to switch the gate member 24 to the normal state, the coherence effects are destroyed and the resistance in the normal state of the gate is that of the thin tin gate layer 24, since it is no longer coupled to the thick member. Consequently, two advantages are achieved by this configuration. First, greater gain can be achieved due to the increased critical current of the gate region. Secondly, since the switching time is inversely proportional to the resistance of the gate in the normal state, greater speed can be obtained because of the high resistance of the thin gate layer in the normal state. When the gate member is switched to the normal state, an increase in voltage is seen between gate lines 25 and 26. This voltage drop or signal may be utilized by appropriate output means 29 connected across the device. The output means 29 may comprise, for example, a sense amplifier coupled to room temperature peripheral logic equipment. Accordingly, it may be seen that this gate configuration of the invention may be used to perform the same functions as the gate in a conventional cryotron, e.g., where the gate is merely a region of tin inserted in a lead gate line. Hence, all the normal cryogenic logic and memory functions performed by cryotrons are contemplated as functions of the gate configuration of this invention. For a general discussion of these functions and fabrication techniques, see the Proceedings of the IEEE, vol. 52, pp. 1164–1207 (October 1964).

Figure 3:
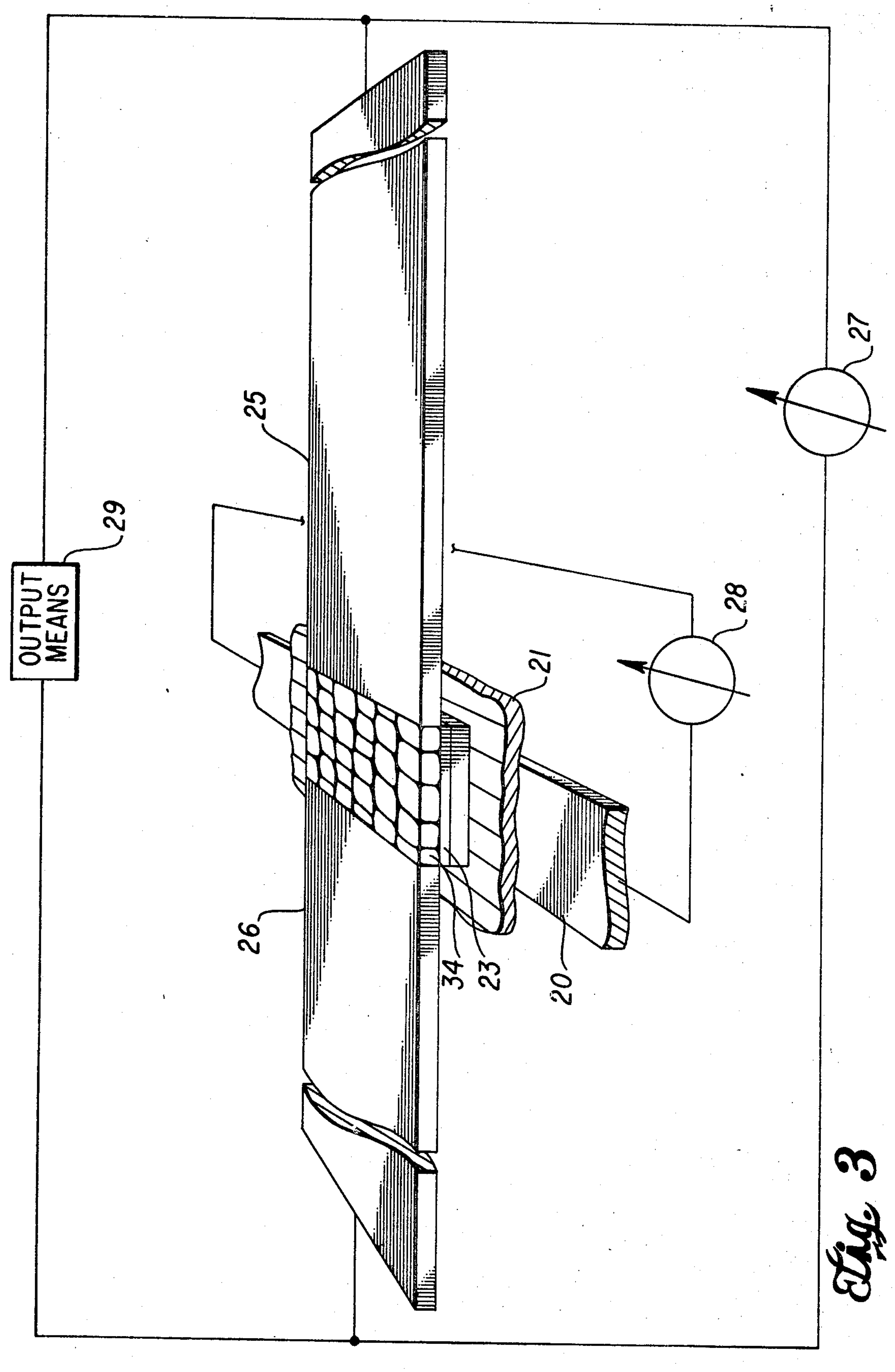
FIG. 3 depicts a modification of the device shown in FIG. 2.

FIG. 3 represents an alternative embodiment of the device depicted in FIG. 2. The reference numerals in FIG. 3 indicate elements like those indicated by the same reference numeral in FIG. 2 except that gate element 34 instead of being a thin continuous film, consists of a discontinuous film which likewise displays a high resistance in the normal state. "Discontinuous" means that the film is marked by breaks or gaps and thus offers high impedance to the flow of electrons.

Again, for purposes of illustrating the barrier region, the control line 20 is shown located beneath the gate. However, in actually fabricating the device, it is preferable to locate the control above the device, i.e., adjacent the discontinuous superconductive gate member, so that the magnetic flux from the control more readily penetrates the discontinuous superconductive gate member and drives the gate normal. Accordingly, the device shown in FIG. 3 is fabricated like the device shown in FIG. 2 except that the discontinuous gate member 34 is fabricated, by way of example, by vacuum depositing the gate line and then anodizing the gate region.

Figure 4:
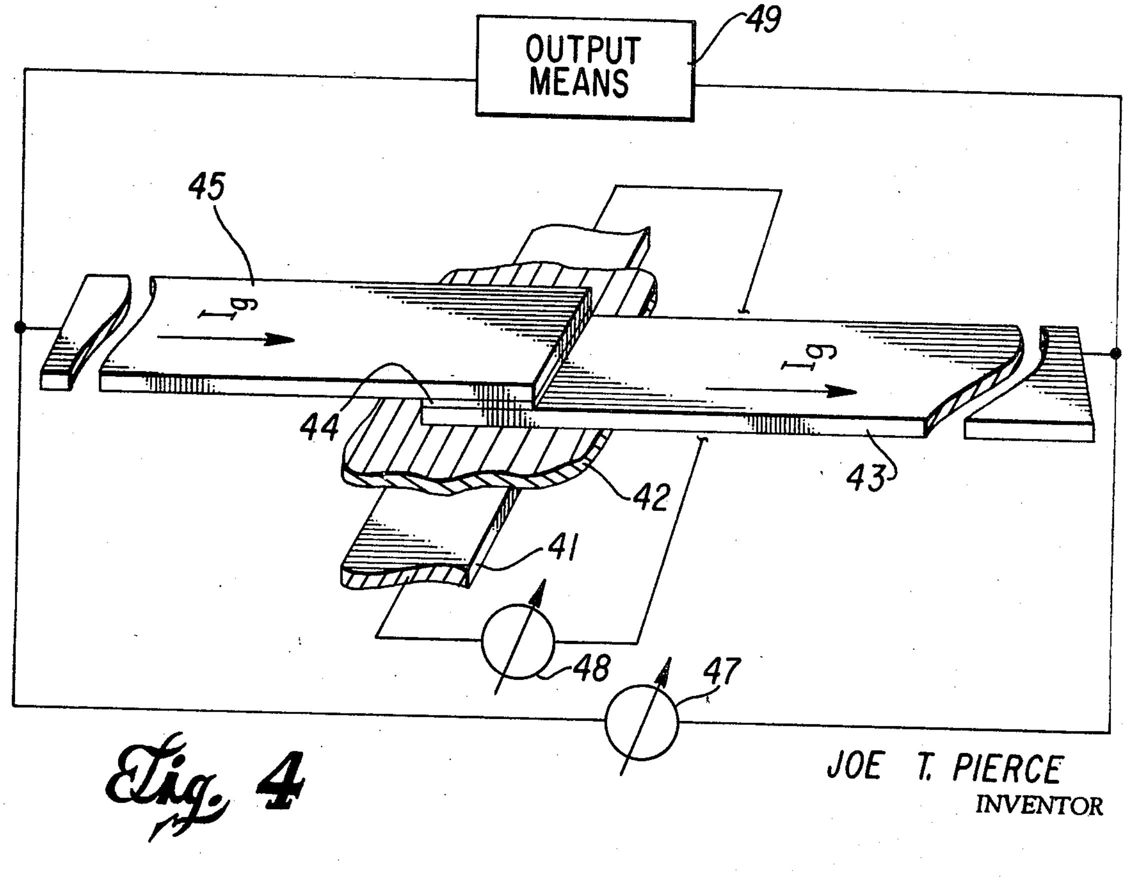
FIG. 4 depicts another device of the invention.

FIG. 4 illustrates another embodiment of the invention. It comprises a control line 41, insulating layer 42, a lead (Pb) gate line 43, a barrier region or layer 44 and lead gate line 45. The device can be made by vacuum-evaporating the various layers of material through appropriate masks. A suitable fabrication sequence is as follows: a ground plane (not shown) is vacuum evaporated onto a suitable substrate such as glass. Thereafter, the substrate is removed from the vacuum system and coated with a layer of photoresist material such as AZ-340 made by the Azoplate Corporation, which serves to insulate the ground plane from the remainder of the device structure. Next, the control line 41, which may be lead 5000 A. thick and 10 mils wide is deposited by vacuum evaporation and use of an appropriate mask. The control line is then covered with suitable insulation 42 of about 3000 A. in thickness to insulate it from the first lead (Pb) gate line 43 which is also put down by evaporation and masking. The barrier region 44 can be formed by breaking the vacuum and exposing the lead line 43 to the atmosphere to permit an oxide layer of about 15 A. to be formed; or appropriate means such as described in the vacuum system to strike an oxygen glow discharge therein and thereby form the oxide layer. Finally, the second lead gate line 45 is vacuum deposited.

Variable direct current source means 47 are provided to cause current to flow from the gate line 45, through the barrier 44, and into a gate line 43. Variable direct current control means 41, are also provided to cause current flow in the control line 41.

Figures 5, 6, 7:
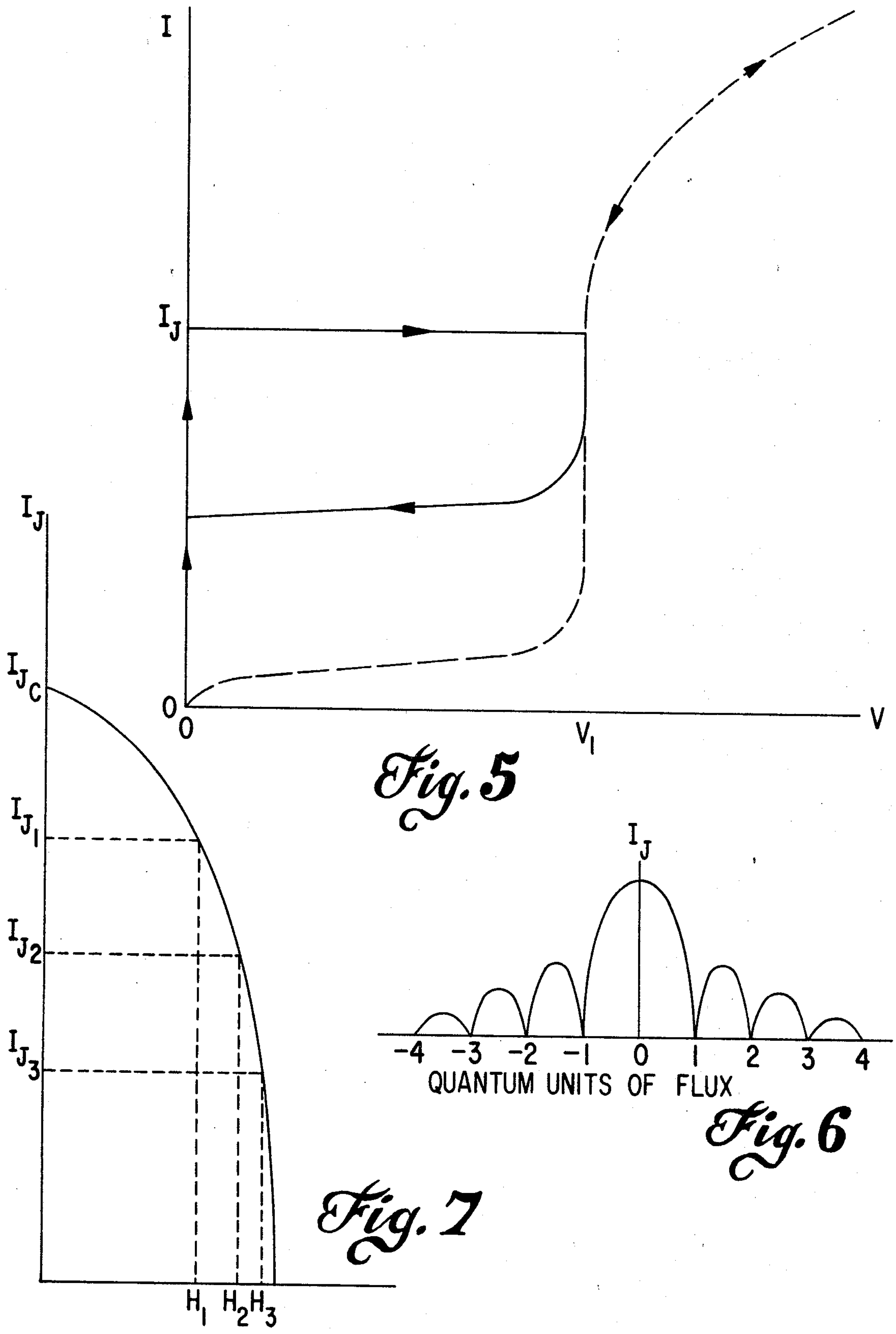
FIG. 5 is a current voltage curve showing the I–V characteristics of a device of the invention.
FIG. 6 illustrates the variation of the maximum tunneling supercurrent as a function of magnetic field.
FIG. 7 is an enlarged view of that portion of FIG. 5 between zero and one positive quantum unit of flux.

The current voltage characteristics of a superconductive tunneling device depicted in FIG. 4 are shown in FIG. 5. The barrier displays a zero voltage current for currents less than a certain maximum value $I_J$. When this critical value is exceeded, the barrer switches abruptly to the single electron tunneling state with a corresponding increase in voltage across the barrier which may be utilized by appropriate output means 49, connected across the barrier as shown in FIG. 4. The output means 49 may comprise, for example, a sense amplifier coupled to room temperature peripheral logic equipment. This voltage which appears across the barrier while the barrier is in the single electron tunneling state, is commonly referred to as the output voltage, or signal. The output voltage is determined by the superconductors chosen for the barrier. When both superconductors are lead, the output voltage is about 2.5 millivolts.

As may be seen from the curve in FIG. 5 the transition from output to zero voltage when current is decreased and pair tunneling is restored occurs at a current somewhat less than $I_J$ and thus produces a hysteresis effect. The dashed curve in FIG. 5 is the current-voltage (I–V) characteristic of the single electron tunneling state. As the voltage becomes sufficiently large, the tunneling current asymptotically approaches ohmic character.

The effect of a magnetic field upon the maximum tunneling supercurrent is illustrated in FIG. 6, where $I_J$ represents the super-current. When the magnetic flux in the insulating barrier is zero, the tunneling supercurrent is at a maximum. Minima occur when the flux in the barrier is an integral number of quantum units. A quantum unit of flux is given by $hc/2e$ (where $h$ is Planck's constant, $c$ is the speed of light, and $e$ is the charge of an electron) and is equal to $2.07 \times 10^{-7}$ gauss-cm$^2$.

Figure 8:
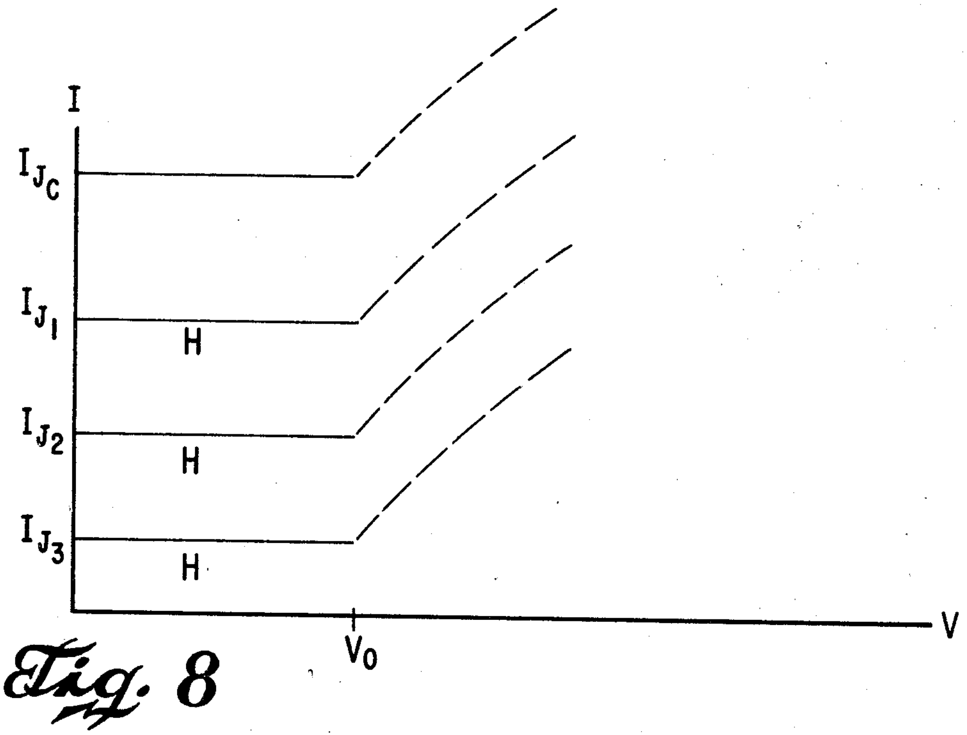
FIG. 8 shows a series of partial current voltage (I–V) curves for a Josephson barrier in response to the application of increasing magnetic fields to the barrier.

The use of the device of the invention as a cryogenic switch may be better understood from a consideration of FIG. 7 which depicts that portion of FIG. 6 between zero and one positive quantum unit of flux. $I_{J_O}$ is the maximum Josephson tunneling current which the barrier can carry. If a magnetic field $H_1$ is applied to the barrier, for example by means of control line 41 shown in FIG. 4, the barrier switches to the single electron tunneling state. An output voltage $V_1$ appears across the barrier. With magnetic field $H_1$ maintained in the barrier, the new zero voltage current is $I_{J_1}$. In a like fashion, the barrier can be switched with magnetic fields $H_2$ and $H_3$ resulting in new zero voltage currents $I_{J_2}$ and $I_{J_3}$ respectively. This mode of operation is further represented in FIG. 8 which depicts a series of I–V curves for a barrier as increasing magnetic fields are applied (the hysteresis portions of the curves have been deleted for simplicity of illustration). Of course, if one quantum unit of flux is applied, then no electron pair tunneling current is restored in the barrier, and the I–V characteristics of the device will be that depicted by the dashed curve in FIG. 5.

Figure 11:
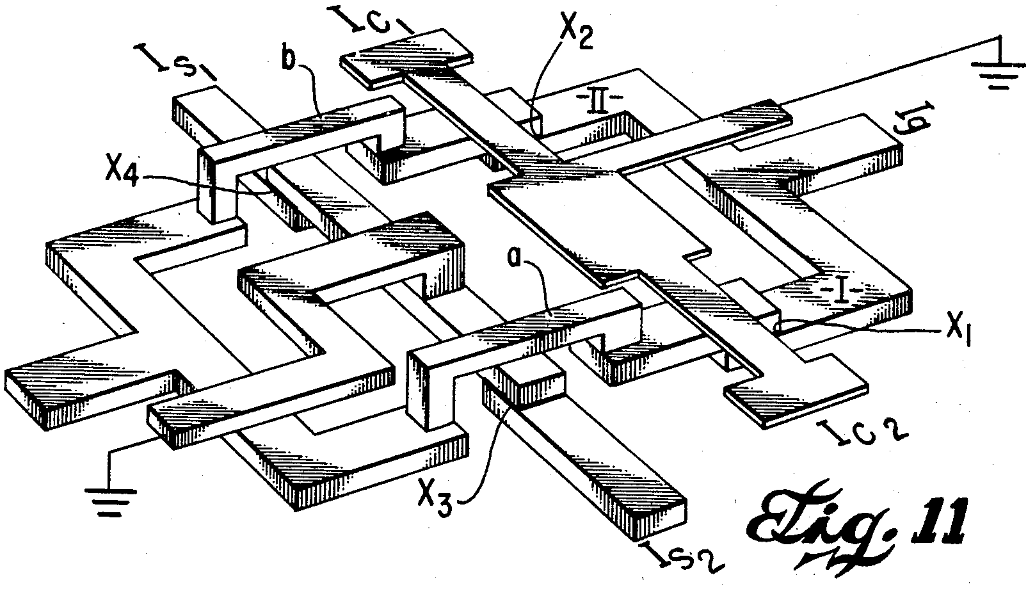

For certain applications, the superconductive tunneling cryotron may be considered a current relay. Therefore, a current steering loop can be constructed as a means for accomplishing logic or storing information. FIG. 11 illustrates an important flip-flop logic or memory element application of the device of the invention. A flip-flop generally comprises a storage loop with two branches or states having control gates in either branch, control lines thereover, and sense lines containing sense gates adjacent thereto.

FIG. 11 depicts a cryogenic flip-flop having two branches I and II and superconductive tunneling gates $X_1$ through $X_4$; $X_1$ and $X_2$ being control gates and $X_3$ and $X_4$ being sense gates. A control line for applying a variable magnetic field to each of the barriers to switch it from the electron pair tunneling state to the single electron tunneling state, is located adjacent but insulated from each of the barriers. A sense line is disposed adjacent but insulated from each of the branches and is intersected by tunneling barriers $X_3$ and $X_4$.

In the absence of control current, a supply current $I_g$ divides between the superconductive branches I and II inversely according to the inductance of the branches. If the barrier in one branch $X_1$ is switched to the normal tunneling state by control current $I_{c_2}$, current redistribution will take place in the loop (branches I and II). As control currents $I_{c_1}$ and $I_{c_2}$ are alternately applied, the control current $I_{c_1}$ has an effect similar to that of current $I_{c_2}$, causing flip-flop action to occur. An important aspect of this flip-flop action lies in the fact that if one barrier is switched, say $X_1$, directing current $I_g$ into the opposite branch II, no redistribution of current occurs when the switching barrier $X_1$ returns to the superconducting tunneling state. Lead extensions *a* and *b* of junctions $X_1$ and $X_2$ respectively are used as controls for sensing barriers $X_3$ and $X_4$.

If sense currents $I_{s_1}$ and $I_{s_2}$ are caused to flow in sense barreirs $X_3$ and $X_4$, when $I_{c_1}$ is applied, current $I_g$ is steered into branch I causing barrier $X_3$ to be switched into the normal tunneling state. The output voltage of $X_3$ can be used to indicate that the flip-flop has current in branch I. The existence of current in branches I or II make up the two logic states generally known in the computer art as the "0" or "1" state.

The superconductive tunneling barrier flip-flop offers several advantages over the conventional cryotron, the foremost of which are associated with the fact that there is no transition of the superconductors to the normal state. Accordingly, greater switching speed, lower power dissipation per switch, and a higher repetition rate are obtained. Other attributes include a greater signal output which is independent of device geometry, lower input signal levels, and greater tolerance with respect to temperature control.

Various modifications of the basic properties of the current steering loop can be used to perform a wide variety of computer functions. The current steering loop can be used for storage. Let $I_{c_1}$ be used to divert $I_g$ into branch I. If $I_{c_1}$ is also removed, a persistent current will result in the loop, the presence of which can be sensed by $X_3$ or $X_4$. The direction of the stored loop current can be determined by the addition of sense bias lines (not shown) under the loop and parallel to each branch. For example, if a current is caused to flow in the sense bias line adjacent $X_4$, generating a magnetic field which adds to the field due to a clockwise flowing loop current, the aiding fields switch the barrier$X_4$. Thus, the direction of the current in the loop can be determined by causing current to flow in a sense bias line in a particular direction and then obsersing whether the sense barrier switches.

Figure 9:
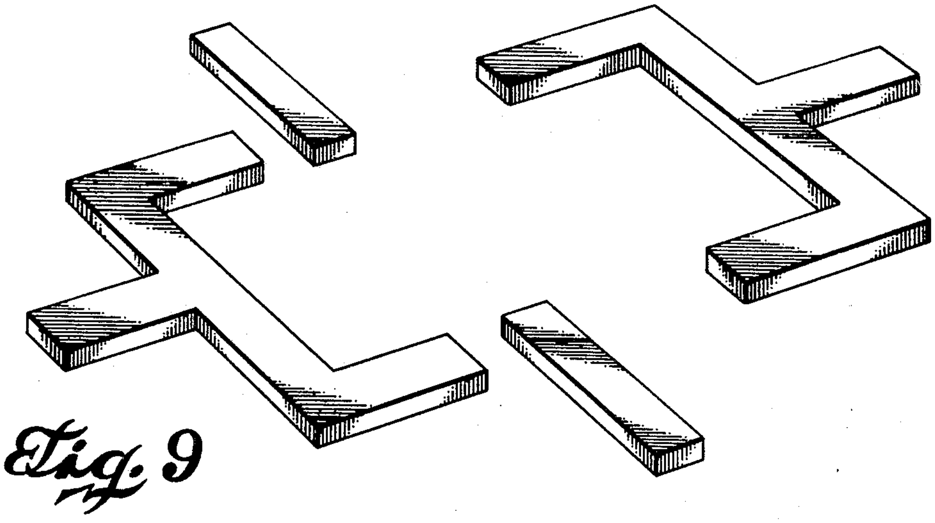
FIGS. 9–11 depict a flip-flop circuit of the invention in various stages of fabrication.
Figure 10:
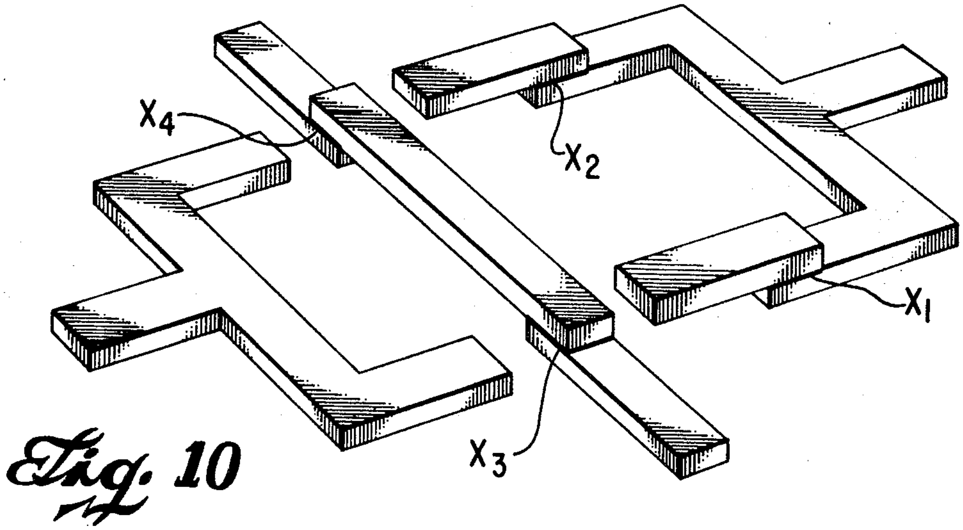

FIGS. 9–11 depict a flip-flop circuit of the invention in various stages of fabrication. For clarity of illustration, the substrate, ground plane and insulative layers are not shown in these figures.

In the process of manufacturing the device shown in FIG. 11, a suitable substrate such as a glass square approximately 2" x 2", for example, is placed in a vacuum system which is then pumped down to approximately $10^{-5}$ mm. of Hg. The vacuum system is then backfilled to approximately $10^{-3}$ mm. of Hg with argon or oxygen and a 12,000 volt AC glow discharge established in such a position that the substrate is located in the dark column. The glow discharge is carried out for five to fifteen minutes to improve adhesion of subsequent layers to the substrate. After the glow discharge treatment, the vacuum system is again pumped down to about $10^{-5}$ mm. of Hg and a film of lead deposited over the entire face of the substrate. This can be accomplished using standard vapor deposition techniques wherein a lead source is heated in the vacuum chamber at a point spaced below the substrate and the vapor is directed upwardly through a chimney to impinge and condense upon the substrate surface. This lead film may range from 1000 to 10,000 A. in thickness depending upon the design of the particular circuitry being constructed and serves as the ground plane.

Next, an insulating film is applied over the surface of the lead film by a suitable technique. The insulating film can be photosensitive material such as that marketed by the Kodak or Azoplate Corporation. After application of the insulating photoresist layer, the substrate with the layers formed thereon is returned to the vacuum system which is then pumped down to about $10^{-5}$ mm. Hg. A layer of lead is then deposited over the entire layer of insulation, portions of which will become part of the superconducting tunneling junctions. The substrate with the layers formed thereon is then removed from the vacuum chamber and a coat of photoresistant material such as Azoplate AZ–17 is applied over the entire surface of the lead film. The AZ–17 is a positive photoresist and when exposed to ultraviolet light is converted into a compound which can be removed by an AZ–17 developing fluid sold by the same manufacturer. After the AZ–17 is developed, only the unexposed areas remain, which can be subsequently removed by a suitable stripper such as acetone. After the lead film is coated over the entire surface with a layer AZ–17 and is dried in a non-detrimental ambient, it may be baked at a low temperature of about 95° C. to improve its adhesion to the lead film.

After the AZ–17 coat is cured, a photomask having transparent portions in predetermined areas where the lead film is to be removed and opaque portions where the film is to be retained, is generally aligned over the substrate and then moved in close proximity to the photosensitive insulating layer to reduce shadowing effects. The insulating or photoresistant material is exposed to an ultraviolet light source for a suitable period of time. The substrate is then immersed in the AZ–17 developer to remove the exposed areas of the AZ–17 coat and then dipped in deionized water to kill the action of the developing fluid.

Next, the substrate with the materials arrayed thereon is immersed in an etchant which will attack only the exposed areas of the lead film. A 10–50% solution, by volume, of $HNO_3$ serves as a very good etchant for this purpose. After the necessary time, the substrate is again quenched in deionized water to kill the etchant and is dried in a non-detrimental ambient so as to avoid contamination of the surface of the lead exposed by the etching process. The remaining AZ–17 coat is then removed by immersing the substrate in a suitable stripping fluid such as acetone, and dried with an inert gas. Again, it is desirable to maintain the exposed areas of the lead film in a non-detrimental atmosphere to prevent oxidation or other contamination of the surface. The development of the device at this point (minus the substrate) is depicted in FIG. 9.

Next, another coat of photosensitive material is applied over the surface of the lead lines remaining on the substrate. After the coat has been dried, a second opaque and transparent photomask is precisely indexed with the pattern previously etched from the lead film and pressed against the substrate. The sensitive film is exposed to ultraviolet light in areas where Josephson barriers are to be formed. Then, when the photoresist is treated as described above, the exposed portions are removed to leave "windows" over the areas which will form the insulating barriers. The substrate is returned to the vacuum chamber and glow discharged in an argon atmosphere as described above. Immediately following the argon glow discharge, an oxygen glow discharge is performed which oxidizes the lead to form a barrier region. The time required depends on the experimental conditions, but can be performed in several seconds with the voltages and pressures used for the argon discharge.

The insulating barriers having been formed, another film of lead is deposited, masked, and etched in the manner described above, to form the second gate lines. The development of the device at this point in its fabrication is depicted in FIG. 10. Thereafter another insulating layer of photoresist is applied to isolate the superconductive tunneling devices from the control and sense lines. The control and sense lines are then formed by deposition, masking and etching, in the manner described for forming the gate lines. The thus completed flip-flop circuit is depicted in FIG. 11.

Figure 12:
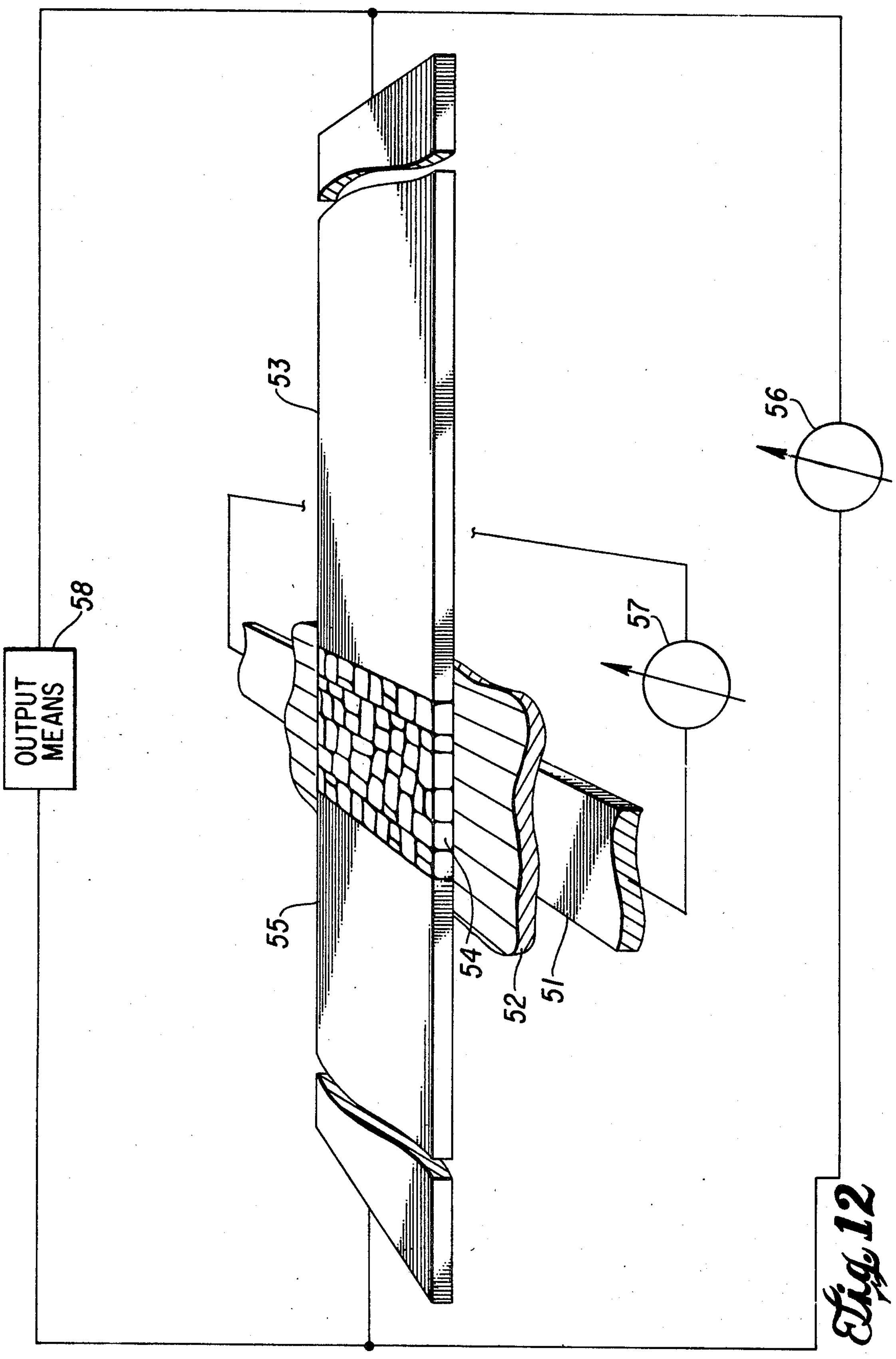
FIG. 12 depicts a superconductive tunneling device of the invention in a cryotron or switching device configuration wherein the gate region comprises a granular superconductor.

Referring now to FIG. 12 there is shown a control line 51, insulating layer 52, lead (Pb) gate lines 53 and 55 and a gate region 54. The gate region 54 comprises a kind of granular or particulate superconductor wherein each grain or particle consists of a homogeneous superconductor, but at each grain boundary, i.e., where the particles join, there is a thin insulating layer, e.g. oxide. This insulating layer is thin enough to be tunneled by the Cooper pairs of the superconductor thus forming a Josephson barrier at each grain boundary or particle interface. As previously mentioned, the granular superconductor of such a tunnel barrier can take one of two basic forms. First, superconductor particles can be deposited directly upon the substrate. They may be oxidized particles of a superconductor metal or the particles may be suspended in an appropriate insulative binder material. Secondly, a layer of superconductor can be deposited and then anodized to form island-like structures, of homogeneous superconductor separated by oxide and spaced so that tunneling can occur between the islands.

One manner in which discrete particles can be readily deposited on a substrate is by settling techniques. For a detailed discussion of these well-known techniques, see the Journal of Physical and Colloid Chemistry, vol. 54, pp. 1045–1053 (1950) and the Transactions of the Electrochemical Society, vol. 94 pp. 112–118 (1945). For example, finely divided powders of a superconductor, more particularly one micron diameter particles of tantalum, which has a transition temperature of 4.5° K., are passed through an argon glow discharge for cleaning and then through an oxygen glow discharge to provide them with an oxide coating of an appropriate thickness to permit tunneling. The powders then drop into a settling liquid upon the surface of a substrate. The settled material may then be patterned as desired.

According to another method, the superconductor particles are embedded in photoresist. This is accomplished by mixing the superconductor powders in photoresist material such as a Azoplate photoresist described above and applied to the surface, dried and then patterned. Since the Azoplate photoresist is a positive photoresist, the areas exposed to light depolymerize. Accordingly, those areas which are desired to be removed are exposed to light, developed and then removed with an appropriate etchant such as acetic acid or a mixture of acetic acid and hydrogen peroxide. This type of etchant will dissolve both the photoresist and the superconductor.

Electrolytic or plasma anodization can be used to form the grain boundaries or barriers. In accordance with this technique, a relatively thick continuous film is deposited which is then modified by anodic means to the desired granular structure. By way of example, tantalum can be electrolytically oxidized with an oxide thickness to voltage ratio of 14 A. per volt. Nearly the same ratio can be achieved by plasma oxidation. By using a ramp voltage generator, and automatic monitoring techniques which have been developed for tantalum thin film technology, a high degree of control can be achieved. For a more complete discussion of such techniques, see Robert J. Weber, "Structure Dependent Properties of Tantalum-Tantalum Oxide Thin Film Resistors," IEEE Transatcions of Materials and Packaging, p. 14 (March 1967). See also C. A. Neugebauer and P. H. Wilson, in Basic Problems in Thin Film Physics: Proceeding of the International Symposium on Thin Film Physics, Göttingen, 1965, edited by R. Niedermayer and H. Mayer (Vanderhoeck and Ruprecht, Göttingen, 1966), p. 579.

Figure 13:
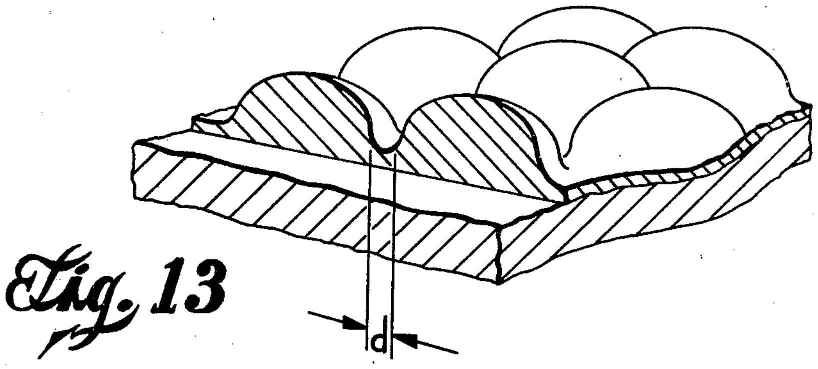
FIGS. 13 and 14 depict a microscopic view of one form of the device shown in FIG. 12 in various stages of fabrication.
Figure 14:
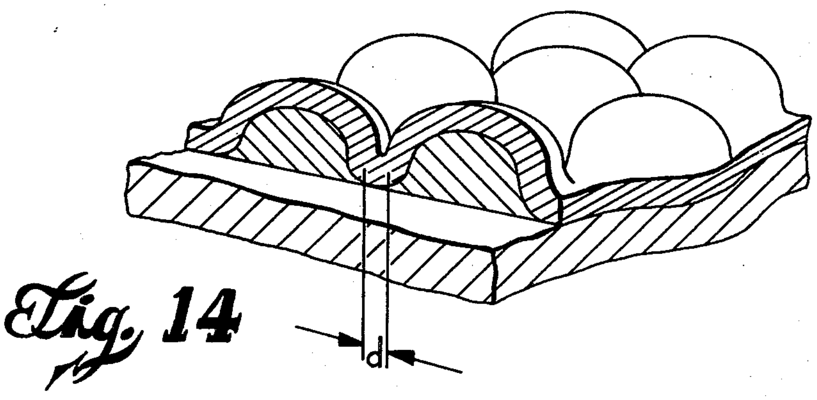

A continuous film is first deposited as shown in FIG. 13. Then the film is anodized. The oxide grows uniformly on the thick and thin portions of the film, as shown in FIG. 14. Oxidation is terminated when the structure has been trimmed to the point where an oxide grain boundary *d* of less than about 40 A. in at least one dimension exists between the island-like structures. The condition can be determined by monitoring the impedance of the film during the oxidation cycle. It is preferred that the smallest dimension of the islands at their base (i.e. where they contact the substrate) exceed 100 A. If desired, the structure may be annealed to improve performance and reliability. The oxide layer further serves as a protective coating.

A suitable sequence for the fabrication of the device shown in FIG. 12 is as follows: The control line 51 is deposited by masking and vacuum evaporation. Thereafter, an insulating layer of photoresist 52 is applied to isolate the control from the gate region. Then a layer of a superconductor such as tantalum is vacuum deposited over the substrate, masked and patterned to form the gate line. The tantalum gate line is then masked to expose the gate region which is then anodized to form a granular superconductive tunneling barrier gate region in the manner described above.

Variable direct current source means 56 are provided to cause current to flow from gate line 55 through the superconductive gate region 54 and into the gate line 53. Variable direct current control means 57 are also provided to cause current to flow in the control line 51. Appropriate output means 58, which may comprise a sense amplifier coupled to room temperature peripheral logic equipment, for example, are connected across the device as shown.

The operating characteristics of the device shown in FIG. 12 are similar to those of the device shown in FIG. 4. When the device is operated in the superconductive mode, a zero voltage current flows through the gate region 54. When control current is applied through control line 51 generating sufficient magnetic flux, the gate switches abruptly to the single electron tunneling state with a corresponding increase in voltage across the gate region which is utilized by the output means 58. Since the granular superconductor gate region is essentially many Josephson barriers connected in parallel, it can be readily switched by a small control current in a relatively narrow control line as it is only necessary for the control flux to penetrate the thickness of the gate and not the entire area of the gate to switch it normal. Accordingly, since a small current is used to switch a comparatively large current, high gain is achieved.

It is to be appreciated that the granular superconductor tunneling device depicted in FIG. 12 can also be operated in the AC Josephson mode to generate electromagnetic radiation. For generation or detection of millimeter and submillimeter radiation, the device is mounted in a suitable wave guide, for example a rectangular metal tube. in which electromagnetic radiation can propagate, and connected to a power source. The device can be used as a detector by coupling incident radiation into the barrier region and appropriately biasing the edvice. A signal will be produced by the junction when exposed to radiation, which can be amplified and detected by standard methods.

While reference has been made to particular superconductors these examples are not to be construed in a limiting sense. It will be comprehended that other superconductors, such as niobium and aluminum, may also be satisfactory for many purposes. It is to be understood that the above-described arrangements are illustrative of but several of the the many possible specific embodiments which can represent applications of the principles of the invention. Numerous and varied other arrangements can readily be devised in accordance with these principles by those skilled in the art without departing from the spirit and scope of the invention.

What is claimed is:

1. A superconductive tunneling device comprising:
   - a layer of granular superconductor wherein each grain is separated from the other by an insulating barrier region thin enough to permit electron pair tunneling therethrough,
   - a variable source of direct current connected across said layer,
   - a control line adjacent but insulated from said layer for applying a variable magnetic field to said layer to switch said barrier region from the electron pair tunneling state to the single electron tunneling state.
   - a variable source of direct current connected to said control line, and
   - output means connected across said granular superconductor.

2. The superconductive tunneling device according to claim 1 wherein each of said grains is separated from the other by an insulating barrier less than 40 A.

3. The superconductive tunneling device according to claim 1 wherein said superconductor is tantalum.

4. An electromagetic radiation generating device for use in the millimeter and submillmeter wavelength regions of the spectrum comprising a granular layer of superconductor wherein each grain is separated from the other by an insulating barrier thin enough to permit electron pair tunneling therethrough, a variable source of direct current connected across said layer and a control line adjacent to but insulated from said granular layer for generating a magnetic flux within said device.

References Cited

UNITED STATES PATENTS

| | | | |
|---|---|---|---|
| 3,116,427 | 12/1963 | Giaver | 317—235 |
| 3,257,581 | 6/1966 | Lodge et al. | 317—234 |
| 3,281,609 | 10/1966 | Rowell | 317—235 |
| 3,296,456 | 1/1967 | Learn et al. | 307—277 |
| 3,303,478 | 2/1967 | Schlig | 307—212 |
| 3,370,210 | 2/1968 | Fiske | 317—234 |
| 3,384,879 | 5/1968 | Stahl et al. | 317—234 |

OTHER REFERENCES

IBM Technical Disclosure Bulletin," "High-Speed Cryogenic Logic Element Based on the Josepheson Tunneling Effect," by Merriam, vol. 7, No. 3, August 1964, p. 271.

Physical Review Letters, "Magnetic Field Dependence of the Josephson Tunnel Current," by Rowell, September 1963, pp. 200–202.

JERRY D. CRAIG, Primary Examiner

U.S. Cl. X.R.

307—298, 306; 29—599